(12) United States Patent
De Keyzer et al.

(10) Patent No.: US 7,202,297 B2
(45) Date of Patent: Apr. 10, 2007

(54) ADHESIVE COMPOSITION

(75) Inventors: Noel Raymond Maurice De Keyzer, Louvain-La-Neuve (BE); Jeffrey George Southwick, Houston, TX (US); Martin Van Dijk, Amsterdam (NL)

(73) Assignee: Kraton Polymers LLC, Houston, TX (US)

( * ) Notice: Subject to any disclaimer, the term of this patent is extended or adjusted under 35 U.S.C. 154(b) by 0 days.

(21) Appl. No.: 10/466,590

(22) PCT Filed: Jan. 17, 2002

(86) PCT No.: PCT/EP02/00525

§ 371 (c)(1),
(2), (4) Date: Jan. 20, 2004

(87) PCT Pub. No.: WO02/057386

PCT Pub. Date: Jul. 25, 2002

(65) Prior Publication Data

US 2004/0116582 A1 Jun. 17, 2004

(51) Int. Cl.
*C08K 5/01* (2006.01)

(52) U.S. Cl. .................. 524/474; 524/499; 524/505

(58) Field of Classification Search ............... 524/474, 524/499, 505
See application file for complete search history.

(56) References Cited

U.S. PATENT DOCUMENTS

| | | | |
|---|---|---|---|
| 4,717,749 A | 1/1988 | Tang et al. ............... 524/271 |
| 4,987,194 A | 1/1991 | Maeda et al. ............. 525/314 |
| 5,057,571 A | 10/1991 | Malcolm et al. .......... 524/505 |
| 5,143,961 A | 9/1992 | Scholl et al. ............. 524/317 |
| 5,278,232 A | 1/1994 | Seelert et al. ............ 525/71 |
| 5,292,819 A | 3/1994 | Diehl et al. .............. 525/314 |
| 5,399,627 A | 3/1995 | Diehl et al. .............. 525/314 |
| 5,474,875 A | 12/1995 | Loerzer et al. ........... 430/281 |
| 5,516,824 A | 5/1996 | Masse et al. |
| 5,552,493 A | 9/1996 | Spence et al. ............ 525/314 |
| 5,583,182 A | 12/1996 | Asahara et al. |
| 5,618,882 A | 4/1997 | Hammond et al. |
| 5,916,959 A | 6/1999 | Lindquist et al. ......... 524/505 |
| 5,948,594 A | 9/1999 | Dudek et al. ............ 430/273.1 |
| 6,103,814 A | 8/2000 | van Drongelen et al. ... 524/505 |
| 6,106,939 A * | 8/2000 | Donker et al. .......... 428/355 BL |
| 6,136,921 A | 10/2000 | Hsieh et al. ............. 525/107 |
| 6,380,305 B1 | 4/2002 | Sheu ...................... 525/71 |
| 6,455,627 B1 * | 9/2002 | De Keyzer et al. ....... 524/505 |
| 6,465,557 B1 * | 10/2002 | De Keyzer et al. ....... 524/474 |
| 6,657,000 B1 * | 12/2003 | De Keyzer et al. ....... 524/505 |
| 2002/0155903 A1 | 10/2002 | Kato et al. |

FOREIGN PATENT DOCUMENTS

| | | |
|---|---|---|
| CN | 1138055 | 9/1996 |
| CN | 1153183 | 7/1997 |
| DE | 29 42 128 A1 | 4/1981 |
| EP | 0 298 319 B1 | 12/1992 |
| EP | 0 517 317 B1 | 12/1992 |
| EP | 0 669 350 A1 | 8/1995 |
| EP | 0 545 181 B1 | 9/1995 |
| EP | 0 615 433 B1 | 3/1997 |
| EP | 0 802 251 | * 10/1997 |
| EP | 0 553 662 B1 | 10/1998 |
| EP | 0 690 092 B1 | 10/2001 |
| EP | 0 878 504 B1 | 7/2002 |
| EP | 1 084 206 B1 | 7/2002 |
| EP | 0 826 380 B1 | 10/2002 |
| EP | 0 833 207 B1 | 11/2002 |
| JP | 02-102212 | 4/1990 |
| JP | 5070699 | 3/1993 |
| JP | 5112726 | 5/1993 |
| JP | 5163444 | 6/1993 |
| JP | 5-345885 | * 12/1993 |
| JP | 5345885 | 12/1993 |
| JP | 2000239635 | 9/2000 |
| JP | 2001100396 | 4/2001 |
| JP | 2001100397 | 4/2001 |
| JP | 2002265748 | 9/2002 |
| WO | 00/14170 | 3/2000 |
| WO | WO 02/057386 | 7/2002 |

* cited by examiner

*Primary Examiner*—Peter Szekely

(57) ABSTRACT

The invention relates to an adhesive composition comprising (i) one or more styrenic block copolymers, (ii) a tackifier resin, and (iii) one or more plasticizers, wherein the or one of the styrenic block copolymers is of the general formulae $$A\text{-}C\text{-}A, \quad (1)$$

or $$(A\text{-}C)_n\text{-}X, \quad (2)$$

wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature (Tg) of at most −50° C. (determined according to ASTM E-1356-98), n is an integer equal to or greater than 2, and X is the residue of a coupling agent, and wherein the tackifier resin has an aromaticity (in relative percentage of aromatic protons as determined by H-NMR) in the range of from 3 to 18%.

14 Claims, 3 Drawing Sheets

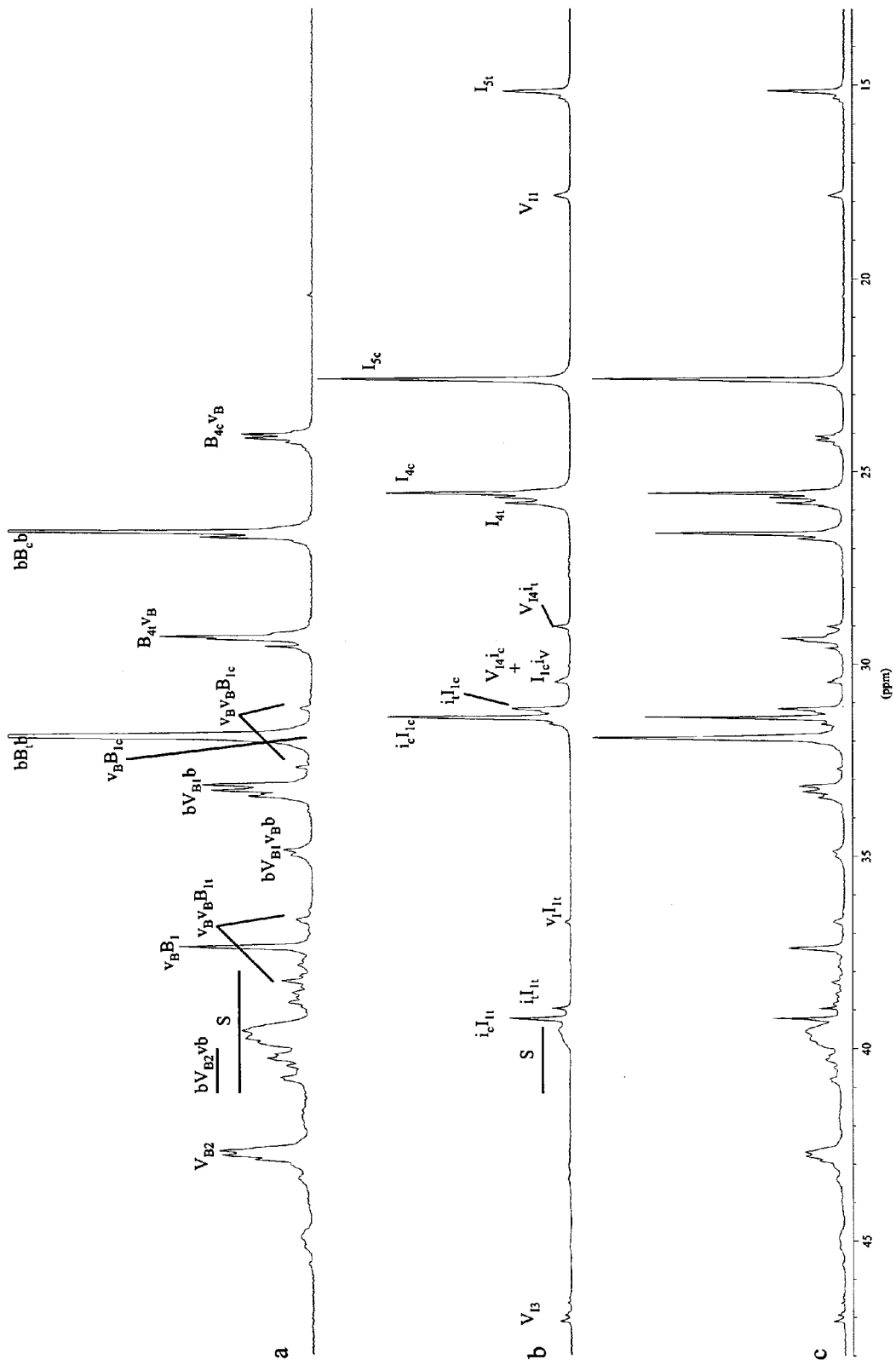
Figure 1: The aliphatic part of 13C NMR spectra. a) a typical styrene/butadiene co-polymer. b) a typical styrene/isoprene co-polymer. c) the electronical sum of a and b.

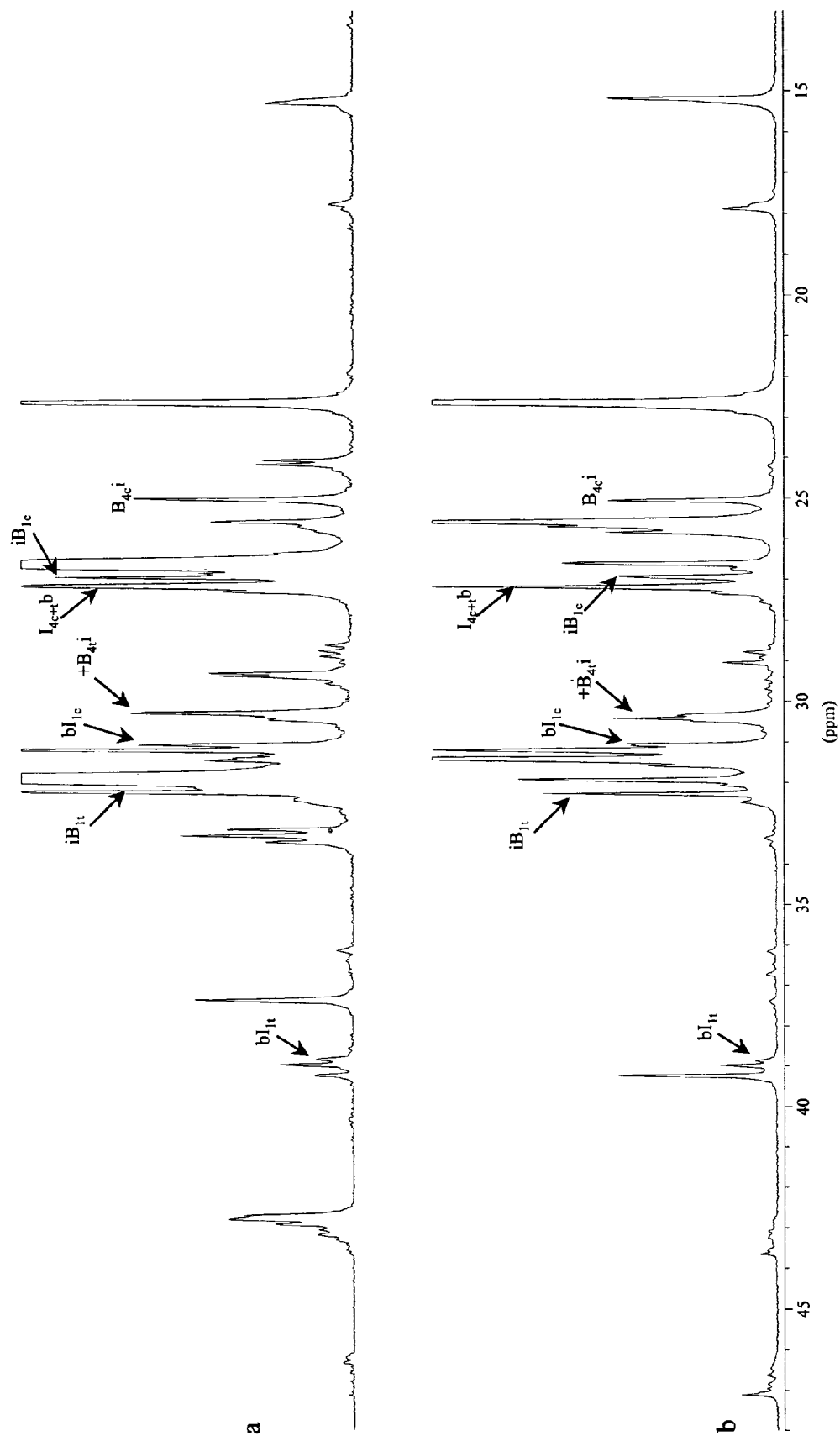
Figure 2: The aliphatic part of 13C NMR spectra. a) mixed butadiene/isoprene copolymer B/I = 4/1. b) mixed butadiene/isoprene copolymer B/I = 1/3.

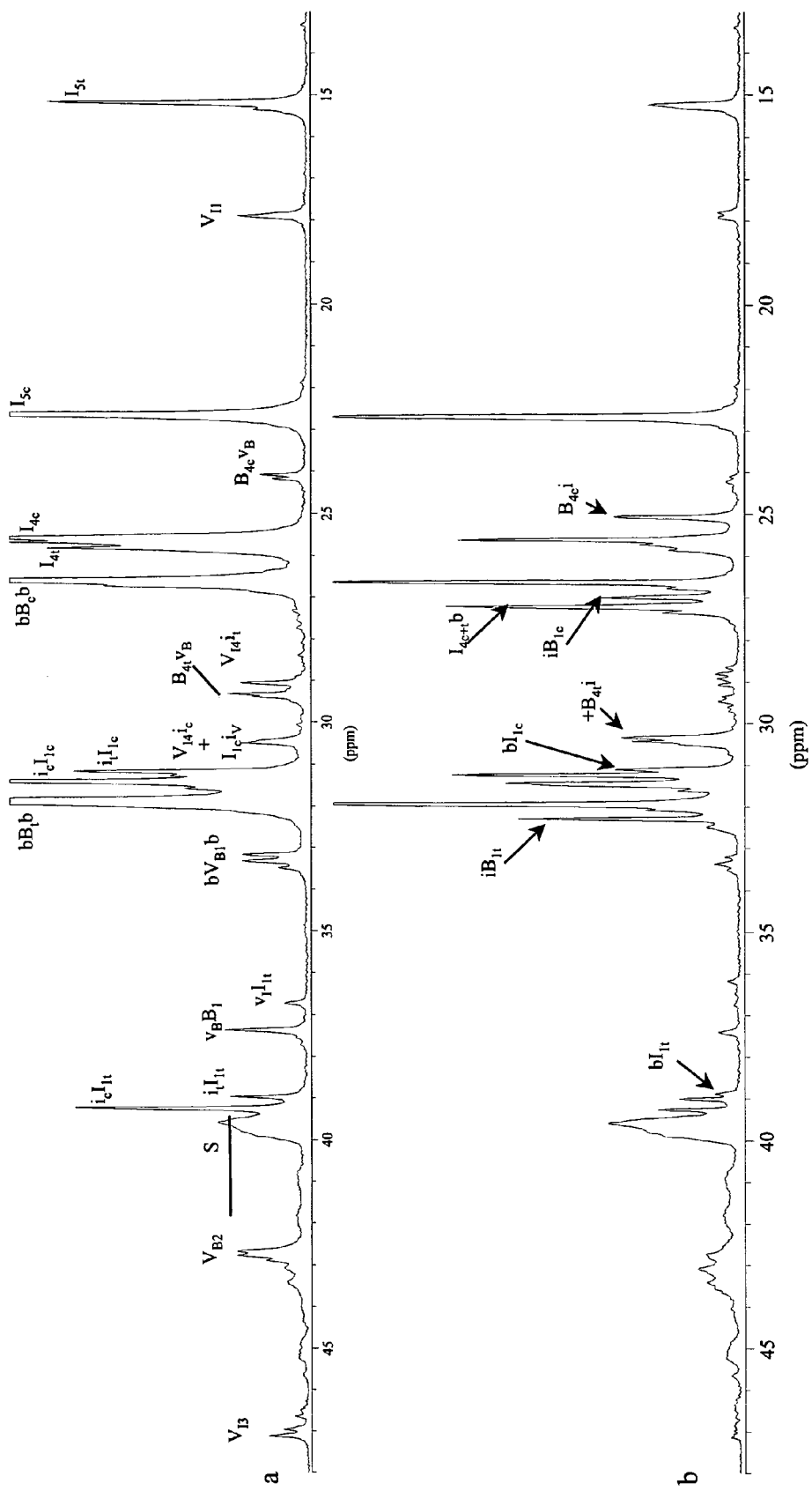
Figure 3: The aliphatic part of 13C NMR spectra. a) block styrene/butadiene/isoprene co-polymer and b) mixed midblock butadiene/isoprene styrene/butadiene/isoprene co-polymer

ADHESIVE COMPOSITION

FIELD OF THE INVENTION

An adhesive composition comprising (i) one or more styrenic block copolymers, (ii) one or more tackifier resins, and (iii) optionally one or more plasticizers.

BACKGROUND OF THE INVENTION

Adhesive compositions based on styrenic block copolymers as thermoplastic elastomer components are well known in the art. These compositions are for instance used as PSA (pressure sensitive adhesive) for industrial tapes, packaging tapes and labels, and in multipurpose hot-melt adhesive compositions which may be used to bond or construct articles in the manufacture of disposable soft goods, such as diapers, feminine care articles, surgical drapes and the like.

Styrene-isoprene-styrene block copolymers ('S-I-S') and styrene-butadiene-styrene block copolymers ('S-B-S') are widely used in these adhesive compositions. Both classes of block copolymers give the adhesive compositions specific properties related to the respective inherent characteristics of these block copolymers. For example, the softness of S-I-S makes this polymer the material of choice for pressure sensitive applications in tapes and labels. Alternatively, the elevated cohesion of S-B-S makes this material attractive for construction adhesives for disposable soft goods.

When compounded into hot melt adhesives S-I-S polymers degrade by a chain scission mechanism; molecular weight is reduced and the cohesive strength of the adhesive is lowered. S-B-S polymers on the other hand tend to degrade by further chemical cross-linking increasing the cohesive strength of the adhesive, but also increasing the elastic modulus, forming a too hard and non-tacky adhesive. The thermal decomposition of both S-I-S and S-B-S based adhesives can ruin the utility of the adhesive product. It would be an advantage to the hot melt adhesive industry if polymers with less tendency to either fall apart (scission) or cross-link would be developed. In EP-669350 and U.S. Pat. No. 5,583,182, adhesive compositions have been described wherein the styrenic block copolymer is a block copolymer of an S-B-I-S type, an $(S-B-I)_n-X$ type or an $(S-I-B)_n-X$ type, wherein S represents a polystyrene block, B represents a polybutadiene block and I represents an isoprene block. These copolymers with block copolymer midblocks "B-I" combine some of the characteristics of S-I-S and S-B-S type polymers. However, the process to make blocks of polydienes in the midblock is demanding, more complex and requires long polymerisation times. It has been also demonstrated that because of the blocky structure in the midblock, their heat stability performance is still inadequate and that the hot-melt viscosity of formulated adhesives is too elevated for industrial applications compared to respectively S-I-S or S-B-S based formulations.

In WO00/14170 an adhesive composition is described based on an elastomeric component comprising (I) an SIS block copolymer and (II) an SBS block copolymer, and on a tackifying component comprising (III) a first hydrocarbon resin compatible with said SIS block copolymer and (IV) a second hydrocarbon resin compatible with said SBS block copolymer. However, the necessity to use two block copolymers (SIS and SBS) as well as two hydrocarbon resins is not a cost effective approach for the manufacture of adhesive compositions, as it requires the adhesive manufacturers to invest deeply in expensive feeding and dosing systems on their extruders.

In DE-2942128 an adhesive composition is described based on 100 part of a non hydrogenated block copolymer A-B-A where A is polystyrene and B a block made of a mixture of Butadiene and Isoprene; from 25 to 300 part of a tackifier resin; from 5 to 200 part of a plasticiser, and some additional additives. Actually, the tackifier resin is a mixture of resins, as is illustrated in the example (50 parts of a glycerine rosin ester ("FLORAL" 85, a trademark) and 50 parts of a synthetic polyterpene resin ("WINGTACK" 95, a trademark)). This mixture appears to be required to be reasonably compatible with the base adhesive polymer.

Mixtures of S-B-S and S-I-S type copolymers, as suggested in the art, do not provide an acceptable alternative either. There is therefore still a need for a pressure sensitive adhesive composition that is at least equal to those based on S-I-S, and indeed superior in heat stability to those based on S-I-S, S-B-S and/or S-I-B-S type block copolymers, and may be based on a single hydrocarbon resin as tackifier resin.

SUMMARY OF THE INVENTION

Accordingly, an adhesive composition is provided comprising (i) one or more styrenic block copolymers, (ii) a tackifier resin, and (iii) one or more plasticizers, wherein the or one of the styrenic block copolymers is of the general structure $$A-C-A \qquad (1),$$

or $$(A-C)_n-X \qquad (2),$$

wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature (Tg) of at most −50° C. (determined according to ASTM E-1356-98), n is an integer equal to or greater than 2, and X is the residue of a coupling agent, and wherein the tackifier resin is an aromatic hydrocarbon resin.

BRIEF DESCRIPTION OF THE DRAWINGS

FIG. 1a is NMR spectrum of the aliphatic region of a typical styrene/butadiene block copolymer;

FIG. 1b is a NMR spectrum of the aliphatic region of a typical S-I block copolymer;

FIG. 1c is the sum of the spectra of both FIG. 1a and FIG. 1b;

FIG. 2a is a NMR spectrum of the aliphatic region of a typical mixed styrene/butadiene copolymer B/I=4/1;

FIG. 2b is a NMR spectrum of the aliphatic region of a typical mixed styrene/butadiene copolymer B/I=1/3;

FIG. 3a is a NMR spectrum of the aliphatic region of a block styrene/butadiene/isoprene co-polymer;

FIG. 3b is a NMR spectrum of the aliphatic region of a mixed midblock butadiene/isoprene styrene/butadiene/isoprene copolymer.

DETAILED DESCRIPTION OF THE INVENTION

Component (i)

The block copolymers used in the composition of the present invention is a block copolymer having a structure represented by the following general formulae

A-C-A    (1), or

(A-C)$_n$-X    (2), wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature (Tg) of at most −50° C. (determined according to ASTM E-1356-98), n is an integer equal to or greater than 2, and X is the residue of a coupling agent.

As an example of the aromatic vinyl compound useful in the practice of the present invention, may be mentioned styrene, alpha-methylstyrene, p-methylstyrene, o-methylstyrene, p-tert.butylstyrene, dimethylstyrene, and vinyl naphthalene. Of these, styrene is particularly preferred from the viewpoints of easy availability, reactivity, and physical properties of the resulting block copolymers. The A polymer block may contain minor amounts of comonomers other than an aromatic vinyl compound, e.g., up to 5 wt % of a copolymerizable monomer such as butadiene and/or isoprene (based on the weight of the total block). These polymer blocks A preferably have a true molecular weight in the range from 9,500 to 25,000.

The mixed polymer midblock (B) is made of butadiene and isoprene as copolymerizing monomers, although it too may contain minor amounts of comonomers, e.g. up to 5 wt % of a copolymerizable monomer such as styrene (based on the weight of the total block).

In the block copolymers according to the present invention, the proportion of bound aromatic vinyl compound is in the range of 10–50 wt %, preferably 15–45 wt % based on the total block copolymer. The proportion of bound butadiene is 15–65 wt %, preferably 20–60 wt % in total. The proportion of bound isoprene is 15–65 wt %, preferably 20–60 wt %. These amounts of bound monomers (plus copolymerizable monomers, if any) add up to 100 wt %. If the proportion of the bound aromatic vinyl compound is lower than 10 wt %, holding power is lowered when the resulting block copolymer is used as a base polymer for e.g. pressure sensitive adhesives. On the other hand, any proportion exceeding 50 wt % generally results in a pressure sensitive adhesive lowered in tackiness.

The block copolymers according to the present invention each preferably have a weight average molecular weight (Mw, expressed in terms of polystyrene) ranging from 100,000 to 500,000, preferably from 150,000 to 250,000 as determined by gel permeation chromatography (GPC, using the method described hereinafter).

The block copolymers according to the present invention each preferably contain 1,2-vinyl bonds and/or 3,4-vinyl bonds in a proportion of at most 15 wt %, based on the weight of conjugated diene. The block copolymers according to the present invention preferably each have a storage modulus (G') of 1 to 300 MPa in a viscoelasticity measurement in a temperature range of from 0 to 50° C., and only one peak on loss tangent (tan δ) attributable to the mixed butadiene/isoprene polymer block at a temperature of −50° C. or below. When a block copolymer having a storage modulus (G') lower than 1 MPa is used as a base polymer for a pressure sensitive adhesive, then the holding power of the PSA is lowered. On the other hand, any storage modulus exceeding 300 MPa results in a pressure sensitive adhesive lowered in tackiness.

A person skilled in the art will appreciate the difference between polymers having a blocky midblock structure, wherein at least 95 wt % of each monomer is part of a homopolymer block, and polymers having a mixed midblock structure wherein no significant single homopolymer block formation has occurred. For instance, polymers having mixed midblocks may be defined as having average homopolymer block lengths of less than 100 monomer units, preferably less than 50 monomer units, more preferably less than 20 monomer units.

Average homopolymer block length may be determined by various methods. The method used in the present application is based on carbon-13 NMR (this method is described in detail in the experimental section).

The block copolymers according to the present invention can be made e.g. by coupling living diblock copolymer prepared by anionic polymerization with a coupling agent.

As examples of the coupling agent, may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, monoethyldichlorosilane, diethyldichlorosilane, monobutyldichlorosilane, dibutyldichlorosilane, monohexyldichlorosilane, dihexyldichlorosilane, dibromosilane, monomethyldibromosilane, dimethyldibromosilane, silicon tetrachloride and silicon tetrabromide; alkoxysilanes such as tetramethoxysilane; divinyl aromatic compounds such as divinylbenzene and divinylnaphthalene; halogenated alkanes such as dichloroethane, dibromoethane, methylene chloride, dibromomethane, dichloropropane, dibromopropane, chloroform, trichloroethane, trichloropropane and tribromopropane; halogenated aromatic compounds such as dibromobenzene; epoxy compounds such as the diglycidyl ether of bisphenol-A and the like (e.g., those sold under the trademark "EPON") and other coupling agents such as benzoic esters, CO, 2-chloropropene and 1-chloro-1,3-butadiene. Of these, "EPON" epoxy compounds (e.g. EPON 825), dibromobenzene, tetramethoxysilane and the like are preferred.

Component (i) may hence comprise a mixture of the coupled polymer according to the general formulae (1) or (2) and of the intermediate diblock, e.g. in a weight ratio of 100/0 to 30/70.

The block copolymers according to the general formulae (1) and (2) can be made by mere adaptation of common processes used for the preparation of S-B-S type block copolymers and/or S-I-S type block copolymers, using a mixture of butadiene/Isoprene instead. Of importance in the preparation of the block copolymers according to the present invention is to avoid homopolymer block formation, ensure appropriate B/I ratio, and to produce a polymer block wherein the random midblock has a Tg of −50° C. or less. This generally rules out the use of randomizers, as for instance used by Kuraray in the production of hydrogenated styrene isoprene/butadiene block copolymers (see U.S. Pat.

No. 4,987,194). It may also be beneficial to adapt the process by adding one or both comonomers during the formation of the mixed midblock.

The composition according to the present invention preferably comprises 100 parts by weight of at least one block copolymer selected from the block copolymers (1) and (2).

Component (ii)

Suitable aromatic hydrocarbon resins as tackifiers are those having a relative percentage of aromaticity (based on aromatic protons relative to the total number of protons in the molecule as determined by H-NMR) in the range of 3 to 18%, preferably in the range of 4 to 14%.

Suitable tackifier resins may be selected from the type generally referred to as mixed aliphatic/aromatic resins or so-called heat reactive hydrocarbon resins. These hydrocarbon resins have a mixed aromatic and aliphatic composition. The streams used to produce these resins contain C-9 components (indene and styrene) and various other C-5 monomers or C-5 dimers.

Examples of suitable mixed aliphatic/aromatic resins and heat reactive hydrocarbons include "EXCOREZ" 2101 (Exxon Chemicals); "Wingtack ET and "Wingtack" 86 (Goodyear Chemicals); "Piccotac" MBG 222, 223 and HERCOTAC" 205 (Eastman) (trademarks).

The preferred tackifier resin is Wingtack ET, in particular as it's color is very light pale.

The composition according to the present invention preferably comprises from 50 to 400 parts by weight, more preferably from 100 to 300 parts by weight of a tackifier.

Component (iii)

Suitable plasticizers include plasticizing oils like low aromatic content hydrocarbon oils that are paraffinic or naphthenic in character (carbon aromatic distribution $\leq 5\%$, preferably $\leq 2\%$, more preferably 0% as determined according to DIN 51378). Those products are commercially available from the Royal Dutch/Shell Group of companies, like SHELLFLEX, CATENEX, and ONDINA oils. Other oils include KAYDOL oil from Witco, or TUFFLO oils from Arco. Other plasticizers include compatible liquid tackifying resins like REGALREZ R-1018. (SHELLFLEX, CATENEX, ONDINA, KAYDOL, TUFFLO and REGALREZ are trademarks).

Other plasticizers may also be added, like olefin oligomers; low molecular weight polymers ($\leq 30,000$ g/mol) like liquid polybutene, liquid polyisoprene copolymers, liquid styrene/isoprene copolymers or liquid hydrogenated styrene/conjugated diene copolymers; vegetable oils and their derivatives; or paraffin and microcrystalline waxes.

The composition according to the present invention may, but need not, contain a plasticizer. If it does, then the composition comprises up to 200 parts by weight, preferably 5 to 150 parts by weight, more preferably 10 to 130 parts by weight of a plasticizer. Indeed, the or each block copolymer (i) may be pre-blended with a small amount of plasticizer by the manufacturer of said copolymer.

Other Components (Non-limitative)

Other rubber components may be incorporated into the adhesive compositions according to the present invention. It is also known in the art that various other components can be added to modify the tack, the odor, the color of the adhesives. Antioxidants and other stabilizing ingredients can also be added to protect the adhesive from degradation induced by heat, light and processing or during storage.

Several types of antioxidants can be used, either primary antioxidants like hindered phenols or secondary antioxidants like phosphite derivatives or blends thereof. Examples of commercially available antioxidants are IRGANOX 565 from Ciba-Geigy (2.4-bis-(n-octylthio)-6-(4-hydroxy-3,5-di-tertiary-butyl anilino)-1,3,5-triazine), IRGANOX 1010 from Ciba-Geigy (tetrakis-ethylene-(3,5-di-tertiary-butyl-4-hydroxy-hydrocinnamate)methane) and POLYGARD HR from Uniroyal (tris-(2,4-di-tertiary-butyl-phenyl)phosphite). Other antioxidants developed to protect the gelling of the polybutadiene segments can also be use, like the SUMILIZER GS from Sumitomo (2[1-(2-hydroxy-3,5-di-terpentylphenyl) ethyl)]-4,6-di-tert-pentylphenylacrylate); SUMILIZER T-PD from Sumitomo (pentaerythrythyltetrakis(3-dodecylthiopropionate)); or mixtures thereof. (IRGANOX, POLYGARD and SUMILIZER are trademarks).

Preparation of the Composition

No particular limitation is imposed on the preparation process of the adhesive composition. Therefore, there may be used any process such as a mechanically mixing process making use of rolls, a Banbury mixer or a Dalton kneader, a hot-melt process characterized in that heating and mixing are conducted by using a melting kettle equipped with a stirrer, like a high shear Z-blade mixer or a single- or twin-screw extruder, or a solvent process in which the compounding components are poured in a suitable solvent and stirred, thereby obtaining an intimate solution of the pressure sensitive adhesive composition.

Use of the Composition

PSA compositions according to the present invention may be applied without using any solvent (e.g., hot-melt) or in the form of their solutions to a base material such as paper or a plastic film by means of a proper coater, thereby producing various kinds of pressure sensitive adhesive tapes or sheets. It may also be used as an adhesive or a sealant without applying to a base material.

Indeed, the block copolymers according to the present invention are excellent in heat stability and hence scarcely undergo a change of melt viscosity with time upon heating and melting them. Therefore, the present adhesion compositions are particularly useful, with good flowability at elevated temperatures, as a hot-melt type pressure sensitive adhesive composition.

During label manufacture, a laminate of a face stock, pressure sensitive adhesive layer and a release liner is passed through an apparatus which converts the laminate into commercially useful labels and label stock. The process involves, amongst others, die-cutting and matrix stripping to leave labels on an a release liner. From U.S. Pat. No. 5,663,228 it is known that good convertibility may be achieved, using blends of S-I-S and S-B or S-B-S block copolymers. The same convertibility may be achieved with the block copolymers of the present invention.

Moreover, the block copolymer with mixed midblock may find additional uses. For example, these mixed polydiene midblock copolymers may be used in Road Marking Paint (RMP) formulations applied on roads as coating, strips and marking signs to improve the traffic safety. RMP's usually consist of a binder (hydrocarbon resins, polymers, plasticisers) and fillers (pigments, mineral fillers and reflective glass beads). The role of the block copolymer in the binder is to provide strength, flexibility, creep resistance but also low temperature properties. The present block copolymers significantly improve the low temperature properties of such RMP's.

In printing plate applications, S-I-S block copolymers give the require flexibility and conformability but have a relatively slow reactivity when exposed to UV light. On the other hand, S-B-S block copolymers are harder, but crosslink faster and more efficiently when irradiated by UV light. Mixed S-B/I-S block copolymers combine nicely in one molecule the advantages of each individual grade.

The present invention will hereinafter be described more specifically by reference to the following examples and comparative examples. However, this invention is not limited to these examples only. Incidentally, all designations of "part" or "parts" and "%" as will be used in the following examples mean part or parts by weight and wt % unless expressly noted. The measurements of physical properties were conducted in accordance with the following methods.

FIGS. 1 and 2

FIGS. 1 and 2 are NMR spectra used to explain the method by which the average homopolymer block length of block copolymers with a mixed midblock may be determined by 13C NMR Spectroscopy.

FIG. 1a shows the aliphatic region of a typical S-B block copolymer. The polystyrene peaks present between 45 and 38 ppm do not disturb the polybutadiene ("pB") spectrum. The S-B polymer contains a rather high amount of vinyl units, as a result of which the spectrum contains peaks that are evidence of the presence of two vinyl units next to each other. FIG. 1b shows the aliphatic region of a typical S-I-S block copolymer. Here the vinyl content ("$V_I$") in the polyisoprene block ("pI") is much smaller. FIG. 1c shows the result of adding the two above mentioned spectra electronically. In this spectrum all typical peaks of a pB block and a pI block are present.

In each spectrum the relevant peaks are designated by a combination of letters and numerals. The capital letters refer to the monomer responsible for the peak: "B" for 1,4-butadiene, "I" for 1,4-isoprene and "S" for styrene. "V" refers to vinyl, this can be either 1,2-butadiene or 3,4-isoprene. If it is not clear from the context, then "$V_B$" and "$V_I$" have been used for 1,2-butadiene and 3,4-isoprene respectively. 1,2-Isoprene is not present in the samples discussed here. The numerals refer to the carbon atom of that specific unit in the following manner:

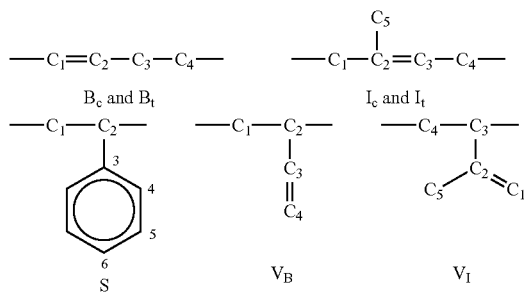

Cis and trans configurations are given in subscript by "c" and "t" respectively. The small letters "b" and "i" refer to the adjacent monomer, which influences the chemical shift of the monomer under discussion (given in capital letter).

These assignments depend on two assumptions: i) the polymer is 'regular', i.e. all monomers are linked head to tail; and ii) the chemical shift of a specific carbon atom depends only on carbons which are at most 4 carbon bonds away, i.e. because of the 1,4 configuration of butadiene and isoprene (which is relative long in comparison with 1,2 monomers) only diads can be distinguished.

FIGS. 2a and b show the aliphatic region of two mixed butadiene/isoprene copolymers, that are used as model polymers, with butadiene/isoprene ratios of 4/1 and 1/3 respectively. Here some extra peaks are seen which clearly are due to the presence of a 1,4-butadiene monomer next to a 1,4-isopropene monomer and reverse. These peaks are characteristic for mixed butadiene/isoprene copolymers and are marked in FIG. 2a. The chemical shifts of these characteristic peaks are as follows:

| Carbon involved | Chemical shift (ppm) |
|---|---|
| $bI_{1t}$ | 38.9 |
| $iB_{1t}$ | 32.3 |
| $bI_{1c}$ | 31.1 |
| $B_{4t}i$ | 30.4 |
| $I_{4c+t}b$ | 27.3 and 27.2 |
| $iB_{1c}$ | 27.0 |
| $B_{4c}I$ | 25.1 |

Determination Average Homopolymer Block Length

In this section is described how the integral of the peaks at characteristic NMR shifts for a mixed polymer may be used to calculate the average homopolymer block length.

The formulae to calculate the block lengths are as follows:

$$\text{Isoprene block length} = \frac{i_c I_{1t} + i_t I_{1t} + i_c I_{1c} + i_t I_{1c} + I_4 i_1}{2 \times sub} + 1$$

$$\text{Butadiene block length} = \frac{bB_t b + bB_c B}{2 \times sub} + 1$$

wherein "sub" corresponds to:

$$\frac{i_4 B_t + i_4 B_c + I_4 b + B_t i + B_c i + bI_{1t} + bI_{1c}}{4}$$

For instance, using these formulae in respect of the spectra in FIG. 2, results in the following average block lengths:

| polymer (B:I) | av. pB block length | av. pI block length |
|---|---|---|
| 2a (4:1) | 8.7 | 1.5 |
| 2b (1:3) | 1.9 | 4.8 |
| 2c (1:1) | 2.5 | 2.3 |

Test Methods

Standard peel, tack, cohesion and viscosity tests were carried out on these formulations as described in the Test method manual for Pressure Sensitive Tapes from the Pressure Sensitive Tape Council (PSTC), the standard FINAT test method for Pressure sensitive materials, the AFERA test methods for Pressure Sensitive Adhesive Tapes and the ASTM related methods. Different testing surfaces have been used in function of the application: chromed stainless steel plates (No. 304)("ss") as recommended by the FINAT, Kraft paper or Polyethylene films ("PE").

Rolling Ball Tack (RBT) is the distance, expressed in centimeters, a steel ball rolls on the adhesive film with a standard initial velocity (Pressure Sensitive Tape Council Test No. 6; ASTM D3121-73). Small numbers indicate aggressive tack.

Flap test is a test developed to simulate the closure force of a tape on a cardboard box. The instrument was developed by E.T.S Holland. An adhesive strip is stuck on Kraft paper and a weight of 1 kg is applied on one end of the strip. The Flap test determines the time needed for the bond on the Kraft paper to fail.

Holding Power (HP) is the time required to pull a standard area (1.3×1.3 cm) of tape from a standard test surface (steel=ss, Kraft paper, PE film) under a standard load (1 kg, 2 or 5 kg), in shear at 2° (Pressure Sensitive Tape Council Method No. 7; ASTMD-3654-82). Long times indicate high adhesive strength. Results are expressed in hours (h) or minutes (min). The type of failure mode is expressed as adhesive failure (AF) or cohesive failure (CF). This test can be carried out at room temperature (about 23° C.) or at a more elevated temperature, depending on the test. For example, in assembly adhesives for diapers, the holding power is tested at 40° C. on PE.

Loop tack (LT) was determined using PSTC-5 and FTM 9 loop tack method. High numbers LT indicate aggressive tack. Results are expressed in Newton/25 mm (N/25 mm).

Peel Adhesion (PA) was determined by Pressure Sensitive Tape Council Method No. 1 and ASTM D3330-83. Large numbers indicate high strength when peeling a test tape from a steel substrate. Results are expressed in N/25 mm.

The SAFT (shear adhesion failure temperature) was measured by 2.5×2.5 cm Mylar to chromed ss plates with a 1 kg weight. The samples are placed in an oven and the temperature raised by 22° C./minute. SAFT measures the temperature at which the lap shear assembly fails.

Hot-melt viscosity (HMV) is measured with a rotational viscometer following ASTM D-3236-78. The viscosity is measured by the torque required to rotate a spindle at constant speed while immersed in a fluid. A sample is placed in a RVTDV-II equipped with a Brookfield Thermocell and the hot-melt viscosity is measured in a temperature range of 120° C. to 190° C. Results are expressed in Pascal·second (Pa·s).

Viscoelastic properties of the polymers and the adhesive formulations have been determined by the Dynamic Mechanical Analyser (RDA-II from Rheometrics Inc.) in the parallel plate mode (7.9 mm diameter plates with a 2 mm gap) over a wide range of temperature. For each sample, the storage modulus G', the loss modulus G" and the tan δ peak were measured at a fixed angular frequency of 10 rad/s; the temperature gradient was 5° C./min.

Glass transition temperatures Tg have been determined by Differential Scanning calorimetry with a temperature sweep of 40° C./min. The Tg is measured at the onset of the transition.

Polystyrene content was determined by 1H NMR.

Average homopolymer block lengths have been determined by 13C NMR using the method described herein before. 13C NMR spectra of polymer samples were obtained with a Bruker AMX-500 FT spectrometer operating at 125 MHz. Quantitative proton-decoupled spectra were recorded with a 90° 13C excitation pulse and a repetition rate of 10 s. 10% (w/w) of polymer solutions in CDCl3 were used. To improve the relaxation time 0.1 mol/l chromium acetylacetonate was added. The applied line broadening was 2 Hz. The spectra were referenced such that the aliphatic carbons of trans-polybutadiene are at 31.9 ppm.

EXAMPLES

Synthesis of the Block Copolymers B–F

Cyclohexane, styrene, butadiene and isoprene were purified by activated aluminumoxide and stored at 4° C. under a nitrogen atmosphere. Dibromoethane (EDB) obtained from Aldrich was used as coupling agent. Prior to synthesis, a monomer mixture of butadiene and isoprene (at a weight/weight ratio given in Table 1) was prepared and stored under nitrogen at 4° C. This mixture was used as such.

An autoclave, equipped with a helical stirrer was charged with cyclohexane and the content was heated to 50 to 60° C. As initiator sec-BuLi was dosed immediately followed by styrene monomer, which was allowed to polymerize to completion. The reaction temperature was increased to 70° C., at which temperature a butadiene/isoprene monomer mixture (B/I) was dosed and reacted. The resulting diblock was coupled with an excess of EDB. This excess was optionally scavenged with sec-BuLi and followed by addition of ethanol as terminator. The reaction mixture was cooled to 40° C., transported to a blending vessel and a stabilization package was added (comprising IRGANOX 565 and tris(nonylphenol)phosphite 0.08/0.35 phr as a cyclohexane solution) and stirred at RT. Dry rubber was obtained by steam coagulation finishing, followed by drying in an oven.

The polymers were analyzed by GPC according to the method described in U.S. Pat. Nos. 5,516,824 and 5,499,409 which are herein incorporated by reference. Table 1 lists the amounts in which the components have been used. The results of the GPC analysis are in Table 2. Table 2 also contains the corresponding properties of a comparative polymer A: an (S-B-I)$_n$ X block copolymer containing an B-I block copolymer midblock with an I/B weight ratio of 50/50, prepared as described in EP-0669350.

Further components used in the examples are listed in Table 3.

TABLE 1

| | Polymer | | | | | |
|---|---|---|---|---|---|---|
| | A | B | C | D | E | F |
| Cyclohexane (1) | 14 | 14.1 | 6 | 6 | 6 | 6 |
| Initiator (mmol) | 14.1 | 14.3 | 12.7 | 15.2 | 12.9 | 17.5 |
| Styrene (gram) | 159.6 | 153.4 | 135.3 | 163.9 | 141.8 | 256.7 |
| B/I (ratio) | 50/50 block | 50/50 | 70/30 | 30/70 | 1:1 | 1:1 |
| B/I (gram) | 430.0 B 433.8 I | 848.0 | 778.6 | 942.7 | 664.0 | 598.1 |
| Excess EDB (mol %) | 20 | 15 | 20 | 20 | 15 | 21 |
| Scavenger (mmol) | 2.7 | 2.1 | — | — | — | — |
| Ethanol (ml) | 0.5 | 0.5 | 1.0 | 1.0 | 0.9 | 1.2 |

TABLE 2

| | Polymer | | | | | |
|---|---|---|---|---|---|---|
| | A | B | C | D | E | F |
| Mw Polystyrene * $10^3$ | 10.8 | 10.9 | 10.7 | 10.8 | 11 | 14.8 |
| Total Mw * $10^3$ | 222 | 217 | 259 | 227 | 195 | 154 |
| Coupling efficiency % | 86 | 83 | 81 | 85 | 87 | 86 |
| Polystyrene content wt % | 15.5 | 15.3 | 14.8 | 14.8 | 17.6 | 30 |
| B/I ratio | 50/50 | 50/50 | 70/30 | 30/70 | 50/50 | 50/50 |
| Vinyl in B wt % | 8 | 8 | 8 | 8 | 8 | 8 |
| Vinyl in I wt % | 5 | 5 | 5 | 5 | 5 | 5 |

TABLE 3

| | |
|---|---|
| D-1107 | KRATON D-1107 is a linear styrene-isoprene-styrene block copolymer containing 15% of polystyrene, has a total molecular weight of 225 000, a coupling efficiency of 83%. |
| D-1160 NS | KRATON D-1160 NS is a linear styrene-isoprene-styrene block copolymer with 19% polystyrene content, a total molecular weight of 178 000 and a coupling efficiency of 100%. |
| D-1161 NS | KRATON D-1161 NS is a linear Styrene-Isoprene-Styrene block copolymer with 15% polystyrene content, a total molecular weight of 220 000 and a coupling efficiency of 81%. |
| D-1165 NS | KRATON D-1165 NS is a linear styrene-isoprene-styrene block copolymer with 30% polystyrene content, a total molecular weight of 141 000 and a coupling efficiency of 81%. |
| D-1122 | KRATON D-1122 is a multi-arm styrene-butadiene-styrene block copolymer with 37% polystyrene content, a total molecular weight of 143 000 and a coupling efficiency of 90%. |
| R-1090 | REGALITE R-1090 is a fully hydrogenated aromatic resin with a softening point of 88° C., an aromaticity of 1.8%, manufactured by Hercules B.V. |
| S-5100 | REGALITE S-5100 is a 50% hydrogenated aromatic resin with a softening point of 100° C., an aromaticity of 16%, manufactured by Hercules B.V. |
| R-7100 | REGALITE R-7100 is a 70% hydrogenated aromatic resin with a softening point of 102° C., an aromaticity of 11.2%, manufactured by Hercules B.V. |
| MBG 212 | MBG 212 is an experimental aliphatic hydrocarbon resin with a softening point of 95° C., an aromaticity of 0%, developed by Hercules B.V. |
| MBG 222 | MBG 222 is an experimental aliphatic hydrocarbon resin with a softening point of 85° C., an aromaticity of 3.8%, developed by Hercules B.V. |
| MBG 223 | MBG 223 is an experimental aliphatic hydrocarbon resin with a softening point of 88° C., an aromaticity of 11.3%, developed by Hercules B.V. |
| P-95 | PICCOTAC 95 is a C5 aliphatic hydrocarbon resin with a softening point of 95° C., an aromaticity of 0%, manufactured by Hercules B.V. |
| E-2203 | ESCOREZ 2203, a modified aliphatic hydrocarbon resin with a softening point of 93° C., an aromaticity of 2.2%, manufactured by Exxon Chemicals |
| E-2101 | ESCOREZ 2101, a modified aliphatic hydrocarbon resin with a softening point of 93° C., an aromaticity of 13.15%, manufactured by Exxon Chemicals |
| W Extra | WINGTACK EXTRA, a modified aliphatic hydrocarbon resin with a softening point of 97° C., an aromaticity of 2.5%, manufactured by GOODYEAR Chemicals |
| W ET | WINGTACK ET, a modified aliphatic hydrocarbon resin with a softening point of 94° C., an aromaticity of 4.2%, manufactured by GOODYEAR Chemicals |
| W 86 | WINGTACK 86, a modified aliphatic hydrocarbon resin with a softening point of 86° C., an aromaticity of 9.6%, manufactured by GOODYEAR Chemicals |
| H-205 | HERCOTAC 205, a modified aliphatic hydrocarbon resin with a softening point of 98° C., an aromaticity of 13.5%, manufactured by Hercules B.V. |
| C-925 | CATENEX 925 is a naphthenic oil from Deutsche Shell Aktiengesellschaft |
| C-956 | CATENEX 956 is a naphthenic oil from Deutsche Shell Aktiengesellschaft |
| O-N68 | ONDINA N68 is a medicinal naphthenic white oil from Deutsche Shell Aktiengesellschaft |
| I 1010 | IRGANOX 1010 is an anti-oxidant from Ciba-Geigy |

Example 1

Table 4 shows the results for various adhesive formulations containing 29% of polymer. Comparative formulation 1 (CF1) is based on polymer A (EP-0669350). Formulation 2 (F2) is based on polymer B. Comparative formulation 3 (CF3) is based on D-1161NS.

Results show that the F2 has better Holding Power values (cohesion) on chromed stainless steel, better Flap test values on Kraft paper, and a lower Hot-melt viscosity than CF1.

TABLE 4

| | Formulation | | |
|---|---|---|---|
| | CF1 | F2 | CF3 |
| Polymer A | 100 | | |
| Polymer B | | 100 | |
| D-1161NS | | | 100 |
| Regalite S-5100 | 200 | 200 | 200 |
| Catenex 925 | 40 | 40 | 40 |
| Irganox 1010 | 1 | 1 | 1 |
| RBT 23° C. (cm) | 7 | 8 | >30 |
| LT (N/25 mm) | 14 | 10 | 13 |
| PA 180° C. (N/25 mm) | 16 | 14 | 15 |
| HP ss 2 kg (h) | 17 | 47 | 104 |
| Flap test Kraft (min) | 180 | 205 | 381 |
| SAFT (° C.) | 85 | 82 | 81 |
| HMV (Pa · s) | 45 | 34 | 13 |

Example 2

Table 5 shows the results for an adhesive formulation containing 45% of polymer as used in packaging tape adhesive application. Polymers in Formulations CF4 and F5 are equivalent to those in formulations CF1 and F2 described in the previous example.

Results show that F5 of the present invention has better Holding Power values (cohesion) on chromed stainless steel, better Flap test value on Kraft paper and better loop tack value than CF4. This shows that Polymer B of the present invention has better adhesive properties than Polymer A (EP-0669350). Polymer B has close adhesive properties to D-1107 (CF6) with a better rolling ball tack value.

TABLE 5

|  | Formulation | | |
|---|---|---|---|
|  | CF4 | F5 | CF6 |
| Polymer A | 100 | | |
| Polymer B | | 100 | |
| D-1107 | | | 100 |
| H-205 | 100 | 100 | 100 |
| C-956 | 45 | 45 | 45 |
| I 1010 | 2 | 2 | 2 |
| RBT 23° C. (cm) | 1 | 1.6 | 11 |
| Flap test (min) | 72 | 215 | 274 |
| LT (N/25 mm) | 5 | 7 | 10 |
| PA (N/25 mm) | 10 | 11 | 12 |
| HP ss 2 kg (h) | 13 AF | >1000 | >1000 |

Example 3

The formulation CF1 and Formulation F2 from Example 1 were placed in a Brookfield Thermocell for 24 Hours at 177° C. Afterward, the adhesives were analysed by GPC to evaluate the polymer stability.

The formulations were injected directly in the GPC column to measure the molecular weight of the polymer only. The results, shown in Table 6, are expressed in % area of material having molecular weights greater than that of the original polymer; identical to that of the original polymer, and smaller than the original polymer.

Variations in the areas of these three respective parts of the GPC analysis give an indication of the degradation level of the polymer and by which mechanisms it degrades.

Results shows that CF1, and hence comparative polymer A is much less heat stable than F2, that contains the polymer B of the present invention. Indeed, the increase in high molecular weight (cross-linking of the butadiene chains) and the increase in low molecular weight (degradation of the isoprene chains) of Polymer A are substantially greater than those of the polymer B.

TABLE 6

| Formulation | Mol. Mass > MW | AREA % MW | Mol. Mass < MW |
|---|---|---|---|
| CF1 BEFORE AGEING | 11.1 | 70.5 | 18.4 |
| CF1 AFTER AGEING 177° C. 24 h | 19.8 | 47.9 | 32.3 |
| % increase | 78% | | 75% |
| F2 BEFORE AGEING | 11.2 | 68.2 | 20.6 |
| F2 AFTER AGEING 177° C. 24 h | 16.9 | 49.9 | 33.2 |
| % increase | 50% | | 60% |

Example 4

Table 7 shows the adhesive properties of formulations based on styrene-butadiene/isoprene-styrene block copolymers with different B/I weight ratios. Polymers B, C, D and KRATON D-1161NS have been targeted to have the same molecular parameters, namely % polystyrene content, total molecular weight and coupling efficiency.

The increase of butadiene in the mid-block decreases the glass transition temperature Tg of the polymer and this has a marked influence on the adhesive properties. The Rolling ball tack decreases (improves because of lower values); the Holding Power on chromed stainless steel decreases; the hot-melt viscosity increases and the formulation glass temperature Tg decreases when the butadiene level in the midblock increases.

TABLE 7

|  | Formulation | | | |
|---|---|---|---|---|
|  | F7 | F8 | F9 | CF10 |
| Polymer C | 100 | | | |
| Polymer B | | 100 | | |
| Polymer D | | | 100 | |
| D-1161 NS | | | | 100 |
| S-5100 | 200 | 200 | 200 | 200 |
| C-925 | 40 | 40 | 40 | 40 |
| I 1010 | 1 | 1 | 1 | 1 |
| Tg (° C.) | −24 | −21 | −18 | −13 |
| RBT 23° C. (cm) | 13.6 | 8 | >30 | >30 |
| LT (N/25 mm) | 13 | 10 | 13 | 13 |
| PA (N/25 mm) | 15 | 14 | 17 | 15 |
| HP ss 2 kg (h) | 12 | 47 | 230 | 104 |
| SAFT ss 0.5 kg (° C.) | 79 | 82 | 77 | 81 |
| HMV 177° C. (Pa · s) | 52.6 | 34.8 | 18.9 | 13 |

Example 5

Table 8 shows the adhesive properties of formulations based on styrene-butadiene/isoprene-styrene block copolymers in packaging tape formulations. CF16 is a packaging tape based on a water based acrylic emulsion.

Polymer B and Polymer C of the present invention can be compounded with a multitude of other components, e.g., with one or two hydrocarbon resins, with different types of hydrocarbon resins, with different polymer content. The resulting formulations give a wide range of properties with good packaging tape adhesive properties. They outperform also waterbased acrylic tapes in adhesive properties.

TABLE 8

| packaging Tape formulations | | | | | | |
|---|---|---|---|---|---|---|
|  | Formulation | | | | | |
|  | CF11 | F12 | F13 | F14 | CF15 | CF16 |
| D-1160 | 100 | | | | | |
| Polymer B | | 100 | | | | |
| Polymer E | | | 100 | 100 | 100 | |
| MBG 212 | 110 | | 60 | | 55 | |
| MBG 223 | | 110 | | | | |
| P-95 | | | | 55 | | |
| H-205 | | | 60 | 55 | | |
| MBG 222 | | | | | 55 | |
| C-956 | 10 | 10 | 20 | 10 | 10 | |
| I 1010 | 1 | 3 | 3 | 3 | 3 | |
| RBT 23° C. (cm) | 29 | 5.5 | 18 | 17 | >30 | 5 |
| Flap Test (min) | 3800 | 610 | 1000 | 3000 | 1700 | 250 |
| HP Kraft 40° C. (min) | 360 | 90 | 45 | 500 | 600 | 100 |
| LT ss (N/25 mm) | 10 | 11.5 | 10 | 12 | 6 | |
| PA 180° ss (N/25 mm) | 21 | 11 | 16 | 13 | 12 | |
| HP ss 2 kg (h) | >1000 | 200 | >150 | >150 | >150 | |
| SAFT (° C.) | — | 99 | 97 | 102 | — | |
| HMV 190° C. (Pa · s) | 56 | 82 | 62 | 90 | 70 | |

Example 6

Table 9 shows the adhesive properties obtained in assembly adhesive in disposable diapers, in sanitary napkins care and elastic attachments. Formulations F18 and F19 (based on polymer F of the present invention) have outstanding Tack, Peel and Holding power on PE. Both outperform S-I-S or S-B-S based formulations (CF17, CF20). Polymer F can be compounded with either S-I-S compatible resins, or S-B-S compatible resins or both, offering a large palette of adhesive properties in function of the end use application. Formulations based on polymer F displayed very low formulation hot-melt viscosities indicating that these formulations can be easily applied with the different techniques, like spiral spray coating, roll coating, die-coating.

TABLE 9 adhesive properties in assembly adhesives

| | Formulation | | | |
|---|---|---|---|---|
| | CF17 | F18 | F19 | CF20 |
| D-1165 | 100 | | | |
| POLYMER F | | 100 | 100 | |
| D-1122 | | | | 100 |
| R-1090 | 250 | 125 | | |
| R-7100 | | | 250 | 220 |
| S-5100 | | 125 | | |
| O N68 | 50 | 50 | 50 | 80 |
| I 1010 | 3 | 3 | 3 | 3 |
| LT on PE (N/25 mm) | 0.9 | 3.5 | 2 | 0 |
| PA PE (N/25 mm) | 11.5 | 14.5 | 15 | 2.5 |
| HP PE 40° C. (h) | 21 | 14 | 3 | 0.3 |
| LT ss (N/25 mm) | 15 | 31 | 10 | 4.5 |
| PA ss (N/25 mm) | 33 | 31.5 | 25 | 21 |
| HP ss 2 kg (h) | 55 | 62 | 110 | 92 |
| SAFT (° C.) | 91 | 95 | 87 | 84 |
| HMV 177° C. Pas | 2.2 | 5.18 | 3.86 | 2.88 |

Example 7

Table 10 provides a comparison of adhesive performance of S-I-S and a polymer of the present invention with an isoprene compatible hydrocarbon resin (HCR).

The low tack values observed in formulations CF22 and CF24 with P-95 and MBG 212 indicate a strong incompatibility with the mid-block. Those resins are in fact incompatible with the butadiene segments.

TABLE 10

| | Formulation | | | |
|---|---|---|---|---|
| | CF21 | CF22 | CF23 | CF24 |
| D-1161 | 100 | | | |
| D-1160 | | | 100 | |
| POLYMER E | | 100 | | 100 |
| P-95 | 150 | 150 | | |
| MBG 212 | | | 110 | 110 |
| C-925 | 40 | 40 | | |
| C-956 | | | 10 | 10 |
| I 1010 | 3 | 3 | 3 | 3 |
| RBT 23° C. (cm) | 5 | >30 | 29 | >30 |
| Flap Kraft (min) | 23 | 2 | 3800 | 26 |
| HP Kraft 40° C. (min) | — | — | 360 | 4 |
| LT ss (N/25 mm) | 12 | 0 | 10 | 0 |
| PA ss 180° (N/25 mm) | 13 | 2 | 21 | 1 |
| HP ss 2 kg (h) | 4 | 73 | >1000 | >400 |
| SAFT ss (° C.) | 106 | 65 | 114 | — |

Example 8

Formulation 25 is made with a blend of SIS and SBS block copolymers, similar to the formulations given in WO/00/14170.

To develop the highest performance, this formulation needs two HCR, namely one that is compatible with isoprene (MBG 212) and one that is compatible with the butadiene (MBG 223).

Similarly, block copolymers with a (B/I) midblock can be compounded with a dual HCR system, namely with an isoprene compatible HCR (P-95 and P-212) and a butadiene compatible HCR (MBG 223 and H-205).

TABLE 11

| | Formulation | | |
|---|---|---|---|
| | CF25 | CF26 | CF27 |
| D-1161 | 50 | | |
| D-1102 | 50 | | |
| POLYMER E | | 100 | 100 |
| MBG 223 | 55 | | 60 |
| MBG 212 | 55 | 55 | 110 |
| H-205 | | 55 | |
| P-95 | | | 60 |
| C-956 | 10 | 10 | 20 |
| I 1010 | 3 | 3 | 3 |
| RBT 23° C. (cm) | 5 | 25 | 20 |
| Flap Kraft (min) | 920 | 2170 | 1930 |
| HP Kraft 40° C. (min) | 76 | 200 | 2880 |
| LT ss (N/25 mm) | 11.5 | 9 | 7 |
| PA ss 180° (N/25 mm) | 12 | 16 | 13 |
| HP ss 2 kg (h) | 64 | 230 | >500 |
| SAFT ss (° C.) | 97 | 103 | 105 |
| HMV 190° C. Pas | 48.8 | 90 | 48 |

Example 9

Surprisingly, it has been discovered that when block copolymers with a mixed (B/I) midblock are compounded with specific aromatic modified aliphatic HCR, high performance adhesives can be obtained.

Formulations F28 to F31 show that MBG 223, E-2101, W ET and W 86. with a medium level of aromatic structure, are all giving high performance adhesive.

Formulations CF32 and CF33 with E-2303 and W Extra, both containing less aromatic structures, do not show tack. This is an indication of incompatibility.

Finally, Formulation F34 with H-205, that contains an elevated level of aromatics in the molecules, gives lower performance adhesive, although still acceptable.

TABLE 12

| | Formulation | | | | | | |
|---|---|---|---|---|---|---|---|
| | F28 | F29 | F30 | F31 | CF32 | CF33 | F34 |
| POLYMER E | 100 | 100 | 100 | 100 | 100 | 100 | 100 |
| MBG 223 | 110 | | | | | | |
| E-2101 | | 110 | | | | | |
| W ET | | | 110 | | | | |
| W 86 | | | | 110 | | | |
| W Extra | | | | | 110 | | |
| E-2203 | | | | | | 110 | |
| H-205 | | | | | | | 110 |
| C-956 | 15 | 15 | 15 | 15 | 15 | 15 | 10 |
| I 1010 | 3 | 3 | 3 | 3 | 3 | 3 | 3 |
| RBT 23° C. (cm) | 4 | >20 | 12 | 5 | — | — | 7 |
| Flap Kraft (min) | 1300 | 1400 | 5000 | 1600 | — | — | 230 |
| HP Kraft 40° C. (min) | 345 | 180 | 260 | 155 | — | — | 50 |
| LT ss (N/25 mm) | 17 | 12 | 7 | 11 | 0* | 0* | 14 |
| PA ss 180° (N/25 mm) | 16 | 17 | 14 | 13 | — | — | 16 |

TABLE 12-continued

| | Formulation | | | | | |
|---|---|---|---|---|---|---|
| | F28 | F29 | F30 | F31 | CF32 | CF33 | F34 |
| HP ss 2 kg (h) | >160 | 450 | >450 | >450 | — | — | 57 |
| SAFT ss (° C.) | 103 | 100 | 112 | 104 | — | — | 92 |
| HMV 190° C. Pas | 71 | 71 | 74 | 67 | — | — | 92 |

*LT = 0, hence not further evaluated

CONCLUSION

When the results in Examples 8 are compared to the results in Example 9, it appears that hydrocarbon resins with a % of aromatic H lower than 3% give no tack to the formulation.

Similarly, the hydrocarbon resins with the highest level of aromatic H—13.5%—gives low cohesion to the formulation, although the general performance are still good.

It can be concluded that aromatic modified aliphatic hydrocarbon resins need to have a % of aromatic H between 3 to 18, preferably 3.5 to 14% to develop the best adhesive properties with a block copolymer having a mixed (B/I) midblock.

The invention claimed is:

1. An adhesive composition consisting essentially of (i) one or more styrenic block copolymers, (ii) a mixed aliphatic/aromatic hydrocarbon tackifier resin, and (iii) one or more plasticizers, wherein said styrenic block copolymer is of the general formulae

A-C-A or (A-C)$_n$-X, wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature (Tg) of at most −50° C. (determined according to ASTM E-1356-98), n is an integer equal to or greater than 2, and X is the residue of a coupling agent, and wherein the tackifier resin has an aromaticity (in relative percentage of aromatic protons as determined by H-NMR) of 4.2%.

2. The adhesive composition of claim 1, wherein polymer block C has average homopolymer block lengths pB respectively pI of less than 100 monomer units.

3. The adhesive composition of claim 2, wherein the aromatic vinyl compound is styrene.

4. The adhesive composition of claim 3, wherein the proportion of bound aromatic vinyl compound is in the range from 10 to 50 weight percent.

5. The adhesive composition of claim 4, wherein the proportion of bound butadiene is in the range from 15 to 65 weight percent.

6. The adhesive composition of claim 5, wherein the proportion of bound isoprene is in the range from 15 to 65 weight percent.

7. The adhesive composition of claim 6, wherein each A polymer block has a true molecular weight in the range of 9,500 to 25,000.

8. The adhesive composition of claim 6, wherein the C polymer block has a vinyl content of less than 15 weight percent.

9. An adhesive composition of claim 8, wherein the block copolymer has a weight average molecular weight (expressed in terms of polystyrene) in the range of 100,000 to 500,000 (as determined by GPC).

10. An adhesive composition of claim 9, wherein component (i) comprises a block copolymer according to general formulae A-C-A or (A-C)n-X, and a diblock copolymer A-B in a weight ratio of block copolymer:diblock in the range of 100/0 to 30/70.

11. The adhesive composition of claim 3 wherein said plasticizer is a low aromatic content hydrocarbon oil.

12. The adhesive composition of claim 11 wherein said composition comprises 100 parts by weight of said block copolymer and 50 to 400 parts by weight of said tackifying resin.

13. The adhesive composition of claim 12 wherein said composition comprises 5 to 150 parts by weight of said plasticizer.

14. An adhesive composition comprising (i) one or more styrenic block copolymers, (ii) a mixed aliphatic/aromatic hydrocarbon tackifier resin, and (iii) one or more plasticizers, wherein said styrenic block copolymer is of the general formulae

A-C-A or (A-C)$_n$-X, wherein each A independently is a polymer block of an aromatic vinyl compound, and C is a mixed polymer block (B/I) of butadiene (B) and isoprene (I) in a weight ratio B:I in the range of 30:70 to 70:30, and said polymer block C has a glass transition temperature (Tg) of at most −50° C. (determined according to ASTM E-1356-98), n is an integer equal to or greater than 2, and X is the residue of a coupling agent, and wherein the tackifier resin has an aromaticity (in relative percentage of aromatic protons as determined by H-NMR) of 4.2%.

* * * * *